(12) United States Patent
Hashman

(10) Patent No.: US 9,010,868 B1
(45) Date of Patent: Apr. 21, 2015

(54) SEAT BELT SPACING DEVICE

(71) Applicant: Kyndal A. Hashman, Columbus, IN (US)

(72) Inventor: Kyndal A. Hashman, Columbus, IN (US)

( * ) Notice: Subject to any disclaimer, the term of this patent is extended or adjusted under 35 U.S.C. 154(b) by 173 days.

(21) Appl. No.: 13/736,387

(22) Filed: Jan. 8, 2013

(51) Int. Cl.
*B60R 22/00* (2006.01)

(52) U.S. Cl.
CPC ...................................... *B60R 22/00* (2013.01)

(58) Field of Classification Search
None
See application file for complete search history.

(56) References Cited

U.S. PATENT DOCUMENTS

| | | | |
|---|---|---|---|
| 1,769,753 A * | 7/1930 | Reuter | 24/198 |
| 2,551,019 A * | 5/1951 | La Pierre | 24/543 |
| 4,648,625 A | 3/1987 | Lynch | |
| 4,786,078 A * | 11/1988 | Schreier et al. | 280/808 |
| 4,832,367 A * | 5/1989 | Lisenby | 280/808 |
| 4,946,198 A * | 8/1990 | Pittore et al. | 280/808 |
| 4,958,416 A * | 9/1990 | Frishling | 24/170 |
| 5,042,838 A * | 8/1991 | Carter | 280/808 |
| 5,154,446 A * | 10/1992 | Blake | 280/808 |
| 5,176,302 A * | 1/1993 | Smith | 224/672 |
| 5,215,333 A | 6/1993 | Knight | |
| D349,589 S * | 8/1994 | York | D29/101.3 |
| 6,203,110 B1 | 3/2001 | Proteau et al. | |
| 6,302,490 B1 * | 10/2001 | Hanna et al. | 297/487 |
| 6,322,149 B1 * | 11/2001 | Conforti et al. | 297/482 |
| 6,782,587 B2 * | 8/2004 | Reilly | 24/198 |
| 8,777,323 B2 * | 7/2014 | Merrill et al. | 297/484 |
| 2005/0012380 A1 * | 1/2005 | Barnes | 297/482 |
| 2005/0121967 A1 | 6/2005 | Crowl | |
| 2006/0091717 A1 | 5/2006 | Bonfield, II | |
| 2006/0273651 A1 * | 12/2006 | Barnes | 297/482 |
| 2009/0077777 A1 | 3/2009 | Horowitz | |
| 2011/0156469 A1 * | 6/2011 | Carpenter | 297/482 |
| 2012/0019043 A1 * | 1/2012 | Merrill et al. | 297/484 |

* cited by examiner

*Primary Examiner* — David E Allred

(57) ABSTRACT

A seat belt spacing device holds a seat belt in spaced relationship to a person to prevent the belt from wrinkling clothes worn by the person. The device includes a medial member and a first bracket coupled to and extending from a first face of the medial member. The first bracket defines a first slot positioned in spaced relationship to the first face configured for receiving a shoulder portion of a seat belt therein. A second bracket is coupled to and extends from a second face of the medial member. The second bracket defines a second slot positioned in spaced relationship to the second face. The second slot is configured for receiving a lap portion of the seat belt therein. Thus, the shoulder portion of the seat belt is retained in spaced relationship to the lap portion of the seat belt.

9 Claims, 3 Drawing Sheets

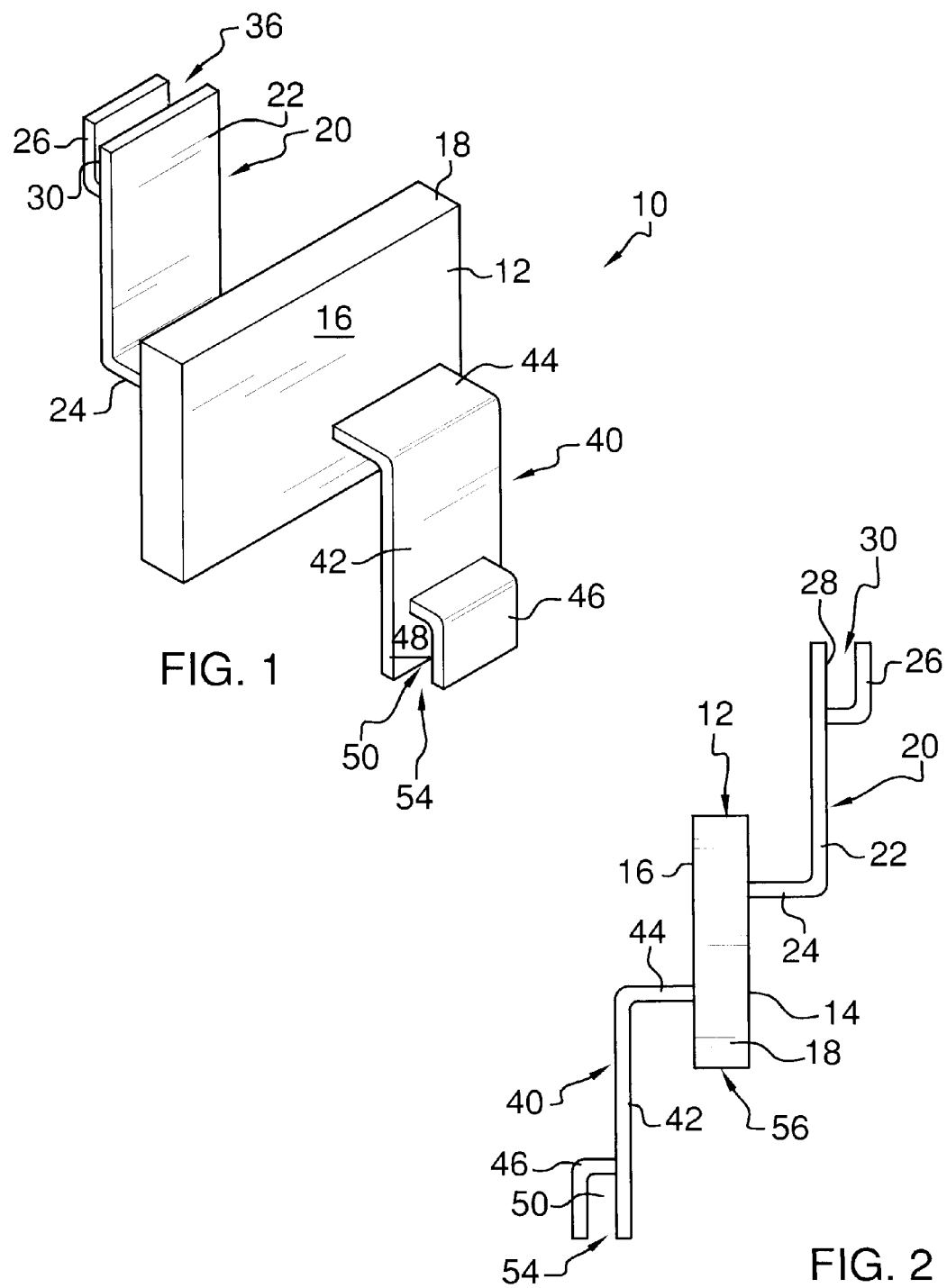

SEAT BELT SPACING DEVICE

BACKGROUND OF THE DISCLOSURE

Field of the Disclosure

The disclosure relates to belt positioning devices and more particularly pertains to a new belt positioning device for holding a seat belt in spaced relationship to a person to prevent the belt from wrinkling clothes worn by the person.

SUMMARY OF THE DISCLOSURE

An embodiment of the disclosure meets the needs presented above by generally comprising a medial member having a first face, a second face, and a perimeter edge extending around the medial member between the first face and the second face. A first bracket is coupled to and extends from the first face of the medial member. The first bracket defines a first slot positioned in spaced relationship to the first face configured for receiving a shoulder portion of a seat belt therein. A second bracket is coupled to and extends from the second face of the medial member. The second bracket defines a second slot positioned in spaced relationship to the second face. The second slot is configured for receiving a lap portion of the seat belt therein. Thus, the shoulder portion of the seat belt is retained in spaced relationship to the lap portion of the seat belt.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a seat belt spacing device according to an embodiment of the disclosure.

FIG. 2 is a side view of an embodiment of the disclosure.

DESCRIPTION OF THE PREFERRED EMBODIMENT

Figure 3:
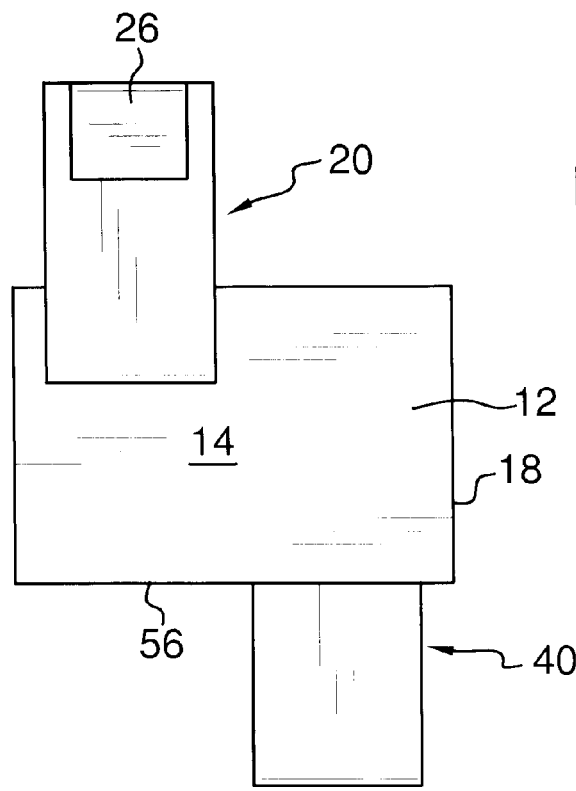
FIG. 3 is a front view of an embodiment of the disclosure.
Figure 4:
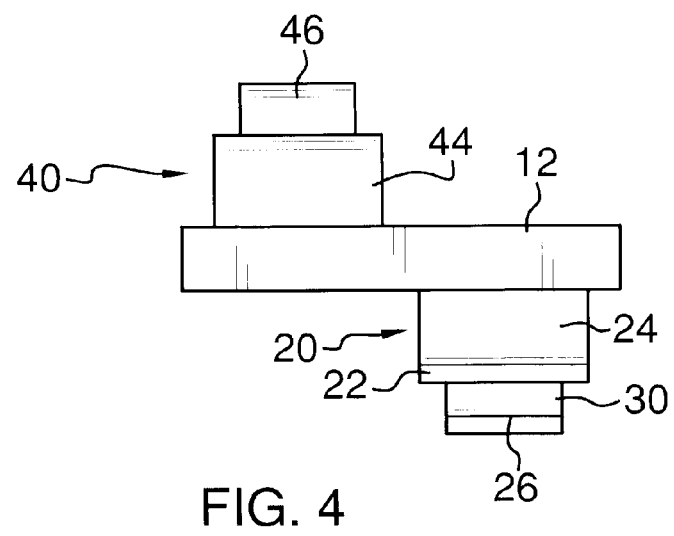
FIG. 4 is a top view of an embodiment of the disclosure.
Figure 5:
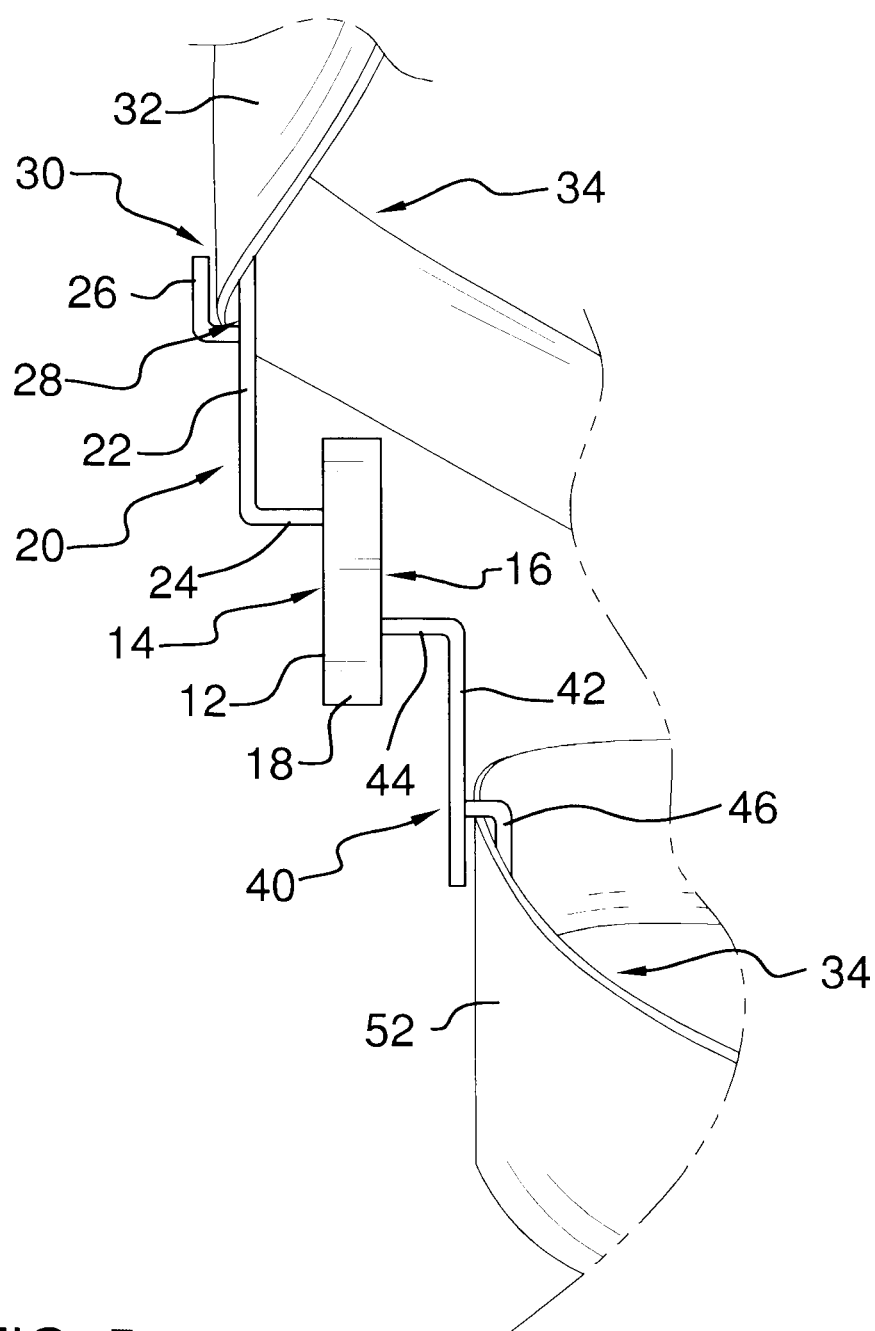
FIG. 5 is a side view of an embodiment of the disclosure.

With reference now to the drawings, and in particular to FIGS. 1 through 5 thereof, a new belt positioning device embodying the principles and concepts of an embodiment of the disclosure and generally designated by the reference numeral 10 will be described.

As best illustrated in FIGS. 1 through 5, the seat belt spacing device 10 generally comprises a medial member 12 having a first face 14, a second face 16, and a perimeter edge 18 extending around the medial member 12 between the first face 14 and the second face 16. The first face 14 and the second face 16 are positioned in substantially parallel spaced planes. A first bracket 20 is coupled to and extends from the first face 14 of the medial member 12. The first bracket 20 comprises a planar medial wall 22 coupled to the medial member 12 by a connection wall 24. The first bracket 20 includes a substantially L-shaped projection 26 coupled to and extending from a distal face 28 of the medial wall 22 of the first bracket 20 relative to the medial member 12. The medial wall 22 of the first bracket 20 is positioned in parallel spaced relationship to the first face 14 of the medial member 12. The first bracket 20 defines a first slot 30 positioned in spaced relationship to the first face 14. The first slot 30 is configured for receiving a shoulder portion 32 of a seat belt 34 therein. The first slot 30 has an open end 36 facing a first direction relative to the medial member 12. The first slot 30 is positioned outwardly offset from a top side 38 of the perimeter edge 18 of the medial member 12.

A second bracket 40 is coupled to and extends from the second face 16 of the medial member 12. The second bracket 40 comprises a planar medial wall 42 coupled to the medial member 12 by a connecting wall 44 coupled to and extending from the second face 16 of the medial member 12. The second bracket 40 includes a substantially L-shaped projection 46 coupled to and extending from a distal face 48 of the medial wall 42 of the second bracket 40 relative to the medial member 12. The medial wall 42 of the second bracket 40 is positioned in parallel spaced relationship to the second face 16 of the medial member 12. The second bracket 40 defines a second slot 50 positioned in spaced relationship to the second face 16 of the medial member 12. The second slot 50 is configured for receiving a lap portion 52 of a seat belt 34 therein. Thus, the shoulder portion 32 of the seat belt 34 is retained in spaced relationship to the lap portion 52 of the seat belt 34 by the first slot 30 and the second slot 50. The second slot 50 has an open end 54 facing in a second direction opposite the first direction in which the first slot 30 faces. The second slot 50 is positioned outwardly offset from a bottom side 56 of the perimeter edge 18 of the medial member 12.

In use, the shoulder portion 32 of the seat belt 34 is positioned in the first slot 30. The lap portion 52 is positioned in the second slot 50. The device 10 holds the shoulder portion 32 of the seat belt 34 in spaced relationship to the person using the seat belt 34, thus preventing the shoulder portion 32 of the seat belt 34 from wrinkling clothes the person is wearing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A seat belt spacing device comprising:
   a medial member having a first face, a second face, and a perimeter edge extending around said medial member between said first face and said second face, wherein the first face faces in an opposite direction from the second face;

a first bracket coupled to and extending from said first face of said medial member, said first bracket defining a first slot positioned in spaced parallel relationship outwardly from said first face, said first slot being configured for receiving a shoulder portion of a seat belt therein; and a second bracket coupled to and extending from said second face of said medial member, said second bracket defining a second slot positioned in spaced parallel relationship outwardly from said second face, said second slot being configured for receiving a lap portion of a seat belt therein wherein the shoulder portion of the seat belt is retained in spaced relationship to the lap portion of the seat belt.

2. The device of claim 1, further comprising said first bracket comprising a planar medial wall and a substantially L-shaped projection coupled to and extending from a distal face of said medial wall of said first bracket relative to said medial member.

3. The device of claim 2, further comprising said medial wall of said first bracket being positioned in parallel spaced relationship to said first face of said medial member.

4. The device of claim 1, further comprising said second bracket comprising a planar medial wall and a substantially L-shaped projection coupled to and extending from a distal face of said medial wall of said second bracket relative to said medial member.

5. The device of claim 4, further comprising said medial wall of said second bracket being positioned in parallel spaced relationship to said second face of said medial member.

6. The device of claim 1, further comprising said first slot having an open end facing a first direction, said second slot having an open end facing in a second direction, said second direction being opposite said first direction.

7. The device of claim 1, further comprising said first slot being positioned outwardly offset from a top side of said perimeter edge of said medial member.

8. The device of claim 1, further comprising said second slot being positioned outwardly offset from a bottom side of said perimeter edge of said medial member.

9. A seat belt spacing device comprising:

a medial member having a first face, a second face, and a perimeter edge extending around said medial member between said first face and said second face, wherein the first face faces in an opposite direction from the second face;

a first bracket coupled to and extending from said first face of said medial member, said first bracket comprising a planar medial wall and a substantially L-shaped projection coupled to and extending from a distal face of said medial wall of said first bracket relative to said medial member, said medial wall of said first bracket being positioned in parallel spaced relationship to said first face of said medial member, said first bracket defining a first slot positioned in spaced parallel relationship outwardly from said first face, said first slot being configured for receiving a shoulder portion of a seat belt therein, said first slot having an open end facing a first direction, said first slot being positioned outwardly offset from a top side of said perimeter edge of said medial member; and a second bracket coupled to and extending from said second face of said medial member, said second bracket comprising a planar medial wall and a substantially L-shaped projection coupled to and extending from a distal face of said medial wall of said second bracket relative to said medial member, said medial wall of said second bracket being positioned in parallel spaced relationship to said second face of said medial member, said second bracket defining a second slot positioned in spaced parallel relationship outwardly from said second face, said second slot being configured for receiving a lap portion of a seat belt therein wherein the shoulder portion of the seat belt is retained in spaced relationship to the lap portion of the seat belt, said second slot having an open end facing in a second direction, said second direction being opposite said first direction, said second slot being positioned outwardly offset from a bottom side of said perimeter edge of said medial member.

* * * * *